UNITED STATES PATENT OFFICE

GEORGE W. RAIZISS AND ABRAHAM I. KREMENS, OF PHILADELPHIA, PENNSYLVANIA, ASSIGNORS TO ABBOTT LABORATORIES, OF NORTH CHICAGO, ILLINOIS, A CORPORATION OF ILLINOIS

NONACID SALT OF DIAMINO-DIHYDROXY-ARSENOBENZENE DIMETHYLENE-SULPHONIC ACID

No Drawing.  Application filed January 14, 1930. Serial No. 420,814.

Our invention relates to pharmaceuticals and methods for preparing them, and has to do more particularly with certain organic compounds which are especially efficacious in the treatment of spirochetic infections.

It has been found that certain derivatives of diamino-dihydroxy-arsenobenzene, such as, for example, the disodium salt of the sulphonic acid of this compound, prepared by treating one molecule of diamino-dihydroxy-arsenobenzene-dihydrochloride with three molecules of formaldehyde and six molecules of sodium bisulphite and precipitating the resulting combination with alcohol and ether, are of therapeutic value, particularly in the treatment of syphilis. However, this disodium salt exhibits an acid reaction in aqueous solution which is very undesirable for the purpose of intravenous injections, and, even when injected intramuscularly, it often gives rise to undesirable reactions. These reactions are believed to be on account of its acid properties.

An object of our invention is to produce derivatives of diamino-dihydroxy-arsenobenzene which will be non-acid, that is, either neutral or alkaline, in reaction, and which will, therefore, avoid the dangers and disadvantages attending the use of a product having acid properties for intravenous and intramuscular injections.

A further object of our invention is to provide a method of conveniently, economically and expeditiously preparing compounds of the class referred to.

Various other objects and advantages will be apparent to those skilled in the art from the disclosure herein given.

We have found that by adding to a solution of the disodium salt of diamino-dihydroxy-arsenobenzene-dimethylene sulphonate a certain amount of alkali, preferably in the form of an alkali-carbonate or an alkali hydroxide, and precipitating the resulting combination with alcohol and ether, we are able to produce a neutral tri-alkali salt of the sulphonic acid or an alkaline tetra-alkali salt, depending upon whether the amount of the added alkali is calculated to neutralize one or both of the hydroxyl radicals of the disodium salt. It will be readily apparent to those skilled in the art that the amount of alkali used, such as sodium-carbonate or sodium hydroxide, may be simply calculated to neutralize either one or both of the hydroxyl groups.

We have also found that the same results may be obtained directly from the diamino-arsenobenzene-dihydrochloride in substantially the same manner as the disodium salt of the sulphonic acid is obtained by increasing the amount of bisulphite reacting with the dihydrochloride from six molecules to nine per molecule of the dihydrochloride, while using three molecules of formaldehyde as in the preparation of disodium salt. The result is the trisodium salt of the sulphonic acid. Similarly, by directly treating the dihydrochloride with twelve molecules of sodium bisulphite and three molecules of formaldehyde the tetrasodium salt is obtained. Obviously, other alkali salts than the sodium salts may be obtained by substantially the same reactions, by substituting other bisulphites.

By means of the reactions above described, there is obtained either the neutral trisodium-diamino-dihydroxy-arsenobenzene-dimethylene-sulphonate, which may be represented by the chemical formula:

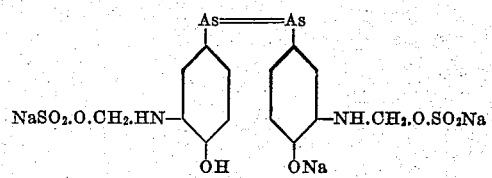

or the alkaline tetrasodium-diamino-dihydroxy-arsenobenzene-dimethylene-sulphonate, which may be represented by the chemical formula:

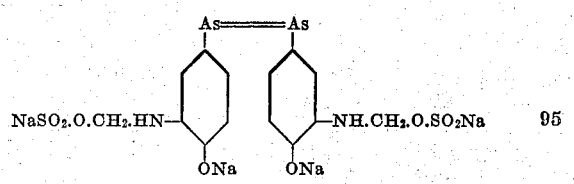

The following examples indicate certain preferred methods of preparing the products embodying our invention and are to be considered merely as exemplary and not as limiting, except to the extent indicated in the appended claims:

Example I 100 grams of disodium-diamino-dihydroxy-arsenobenzene-dimethylene-sulphonate are dissolved in 300 cc. of water and to this are added with continuous stirring 22 cc. of a 33.4 per cent sodium carbonate solution (to produce the trisodium salt) or 44 cc. of 33.4 per cent sodium carbonate solution (to produce the tetrasodium salt).

After five minutes of stirring, the entire liquid is filtered into a mixture of 8000 cc. absolute methyl alcohol and 5000 cc. of absolute ether. The new products separate as light yellow precipitates which are filtered off and dried in vacuo.

Example II 80 grams of dihydroxy-diamino-arsenobenzene-dihydrochloride in aqueous solution are treated with three molecules of formaldehyde and six molecules of sodium bisulphite (which is the usual way of preparing disodium-diamino-dihydroxy-arseno-benzene-dimethylene sulphonate). Just before the reaction mixture would be poured into alcohol and ether, we filter it and treat it with 22 cc. of a 33.4 per cent sodium carbonate solution to produce a trisodium salt, or with 44 cc. of 33.4 per cent sodium carbonate, to produce a tetrasodium salt. After a few minutes stirring the liquid is filtered into a mixture of absolute alcohol and absolute ether. The new products separate as light yellow precipitates, which are filtered off and dried in vacuo.

Example III 100 grams of dihydroxy-diamino-arsenobenzene-dihydrochloride in aqueous solution are treated with three molecules of formaldehyde and with nine molecules of sodium bisulphite to produce the trisodium salt or with twelve molecules of sodium bisulphite to produce the tetrasodium salt. After thirty minutes of mechanical stirring, the clear liquid is filtered into five volumes of a mixture of equal parts of absolute alcohol and absolute ether. The new products separate as light yellow precipitates which are filtered off and dried in vacuo.

Besides the added advantage of being neutral or alkaline in character, these new derivatives are much less toxic than the disodium salt when tested on animals. They are stable bodies both in the dry form and in solution and are valuable therapeutic agents in the treatment of spirochetic infections, as disclosed by our studies in experimental rabbit syphilis.

We claim as our invention:

1. A non-acid salt of diamino-dihydroxy-arsenobenzene-dimethylene-sulphonic acid.

2. A salt of diamino-dihydroxy-arsenobenzene-dimethylene-sulphonic acid, in which the hydrogens of at least three of the hydroxyl groups have been replaced by an alkali metal.

3. A salt of diamino-dihydroxy-arsenobenzene-dimethylene-sulphonic acid, in which the hydrogens of at least three of the hydroxyl groups have been replaced by sodium.

4. A salt of diamino-dihydroxy-arsenobenzene-dimethylene-sulphonic acid, in which the hydrogens of three of the hydroxyl groups have been replaced by an alkali metal.

5. A salt of diamino-dihydroxy-arsenobenzene-dimethylene-sulphonic acid, in which the hydrogens of three of the hydroxyl groups have been replaced by sodium.

6. A salt of diamino-dihydroxy-arsenobenzene-dimethylene-sulphonic acid, in which the hydrogens of all of the hydroxyl groups have been replaced by an alkali metal.

7. A salt of diamino-dihydroxy-arsenobenzene-dimethylene-sulphonic acid, in which the hydrogens of all of the hydroxyl groups have been replaced by sodium.

8. As a pharmaceutical, the trisodium salt of diamino-dihydroxy-arseno-benzene-dimethylene sulphonic acid which may be represented by the formula:

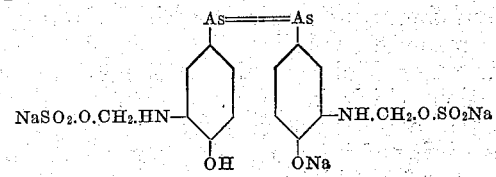

9. As a pharmaceutical, the tetrasodium salt of diamino-dihydroxy-arsenobenzene-dimethylene-sulphonic acid, which may be represented by the formula:

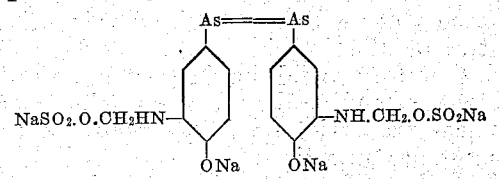

GEORGE W. RAIZISS.
ABRAHAM I. KREMENS.